US012586855B2

(12) United States Patent
Choi et al.

(10) Patent No.: US 12,586,855 B2
(45) Date of Patent: Mar. 24, 2026

(54) BATTERY MODULE AND BATTERY PACK INCLUDING THE SAME

(71) Applicant: LG Energy Solution, Ltd., Seoul (KR)

(72) Inventors: Yongjoon Choi, Daejeon (KR); Junyeob Seong, Daejeon (KR); Hyunjae Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 941 days.

(21) Appl. No.: 17/770,176

(22) PCT Filed: Oct. 29, 2020

(86) PCT No.: PCT/KR2020/014937
§ 371 (c)(1),
(2) Date: Apr. 19, 2022

(87) PCT Pub. No.: WO2021/086070
PCT Pub. Date: May 6, 2021

(65) Prior Publication Data
US 2022/0393283 A1 Dec. 8, 2022

(30) Foreign Application Priority Data
Nov. 1, 2019 (KR) ........................ 10-2019-0138938

(51) Int. Cl.
*H01M 50/242* (2021.01)
*H01M 10/653* (2014.01)
(Continued)

(52) U.S. Cl.
CPC ....... *H01M 50/242* (2021.01); *H01M 10/653* (2015.04); *H01M 50/211* (2021.01); *H01M 50/293* (2021.01)

(58) Field of Classification Search
CPC . H01M 50/211; H01M 50/242; H01M 50/293
See application file for complete search history.

(56) References Cited

U.S. PATENT DOCUMENTS

| | | | | |
|---|---|---|---|---|
| 9,972,811 | B2 * | 5/2018 | Ogawa | ................ H01M 50/258 |
| 10,601,003 | B2 * | 3/2020 | Yang | .................... H01M 10/04 |

(Continued)

FOREIGN PATENT DOCUMENTS

| | | |
|---|---|---|
| CN | 106450072 A | 2/2017 |
| CN | 208722940 U | 4/2019 |

(Continued)

OTHER PUBLICATIONS

Translation of the written opinion of PCT KR2020/014937 (no date) (Year: 0000).*

(Continued)

*Primary Examiner* — Amanda C. Walke
(74) *Attorney, Agent, or Firm* — Lerner David LLP

(57) ABSTRACT

A battery module according to an embodiment of the present invention includes: a battery cell laminated body in which a plurality of battery cells each including an electrode assembly are stacked; a U-shaped frame that accommodates the battery cell laminated body and has an opened upper part; and an upper plate covering the battery cell laminated body on the opened U-shaped frame, wherein the U-shaped frame includes a bottom part and two side parts facing each other, the side part includes a depressed part that is depressed inward toward the battery cell laminated body, and the area of the depressed part is equal to or larger than the area of the electrode assembly.

11 Claims, 6 Drawing Sheets

(51) Int. Cl.
H01M 50/211 (2021.01)
H01M 50/293 (2021.01)

(56) References Cited

U.S. PATENT DOCUMENTS

| | | | | |
|---|---|---|---|---|
| 11,764,435 B2* | 9/2023 | Lee | ..................... | H01M 50/503 |
| | | | | 429/158 |
| 11,858,332 B2* | 1/2024 | Zhang | ................. | H01M 50/244 |
| 12,176,557 B2* | 12/2024 | Choi | ................... | H01M 50/244 |
| 2013/0108909 A1 | 5/2013 | Matsuo et al. | | |
| 2017/0047562 A1 | 2/2017 | Ogawa et al. | | |
| 2017/0141365 A1 | 5/2017 | Kim et al. | | |
| 2017/0365888 A1* | 12/2017 | Kwon | ............... | H01M 10/4207 |
| 2019/0131596 A1 | 5/2019 | Yang et al. | | |
| 2019/0157639 A1* | 5/2019 | Smith | ................. | H01M 50/244 |
| 2019/0198952 A1 | 6/2019 | Choi et al. | | |
| 2019/0267591 A1 | 8/2019 | Park et al. | | |
| 2020/0176745 A1 | 6/2020 | Lee | | |
| 2022/0140428 A1* | 5/2022 | Chi | ..................... | H01M 50/271 |
| | | | | 429/99 |
| 2022/0166098 A1* | 5/2022 | Choi | ................... | H01M 50/209 |
| 2022/0302549 A1* | 9/2022 | Choi | ................... | H01M 50/548 |

FOREIGN PATENT DOCUMENTS

| | | | |
|---|---|---|---|
| CN | 109920944 A | | 6/2019 |
| EP | 3168899 A1 | | 5/2017 |
| JP | 4158440 B2 | | 10/2008 |
| JP | 2013101809 A | | 5/2013 |
| JP | 5601369 B2 | | 10/2014 |
| JP | 2017037789 A | | 2/2017 |
| JP | 6286970 B2 | | 3/2018 |
| JP | 2020517080 A | | 6/2020 |
| JP | 2020522855 A | | 7/2020 |
| KR | 100759395 B1 | | 9/2007 |
| KR | 20080042965 A | | 5/2008 |
| KR | 20190054709 A | | 5/2019 |
| KR | 20190078521 A | | 7/2019 |
| KR | 20190090299 A | | 8/2019 |
| WO | 2019088625 A1 | | 5/2019 |
| WO | 2019098491 A1 | | 5/2019 |

OTHER PUBLICATIONS

Extended European Search Report including Written Opinion for Application No. 20882775.8 dated Dec. 8, 2023, pp. 1-7.
International Search Report for Application No. PCT/KR2020/014937 mailed on Feb. 5, 2021, pp. 1-2.

* cited by examiner

【FIG. 1】
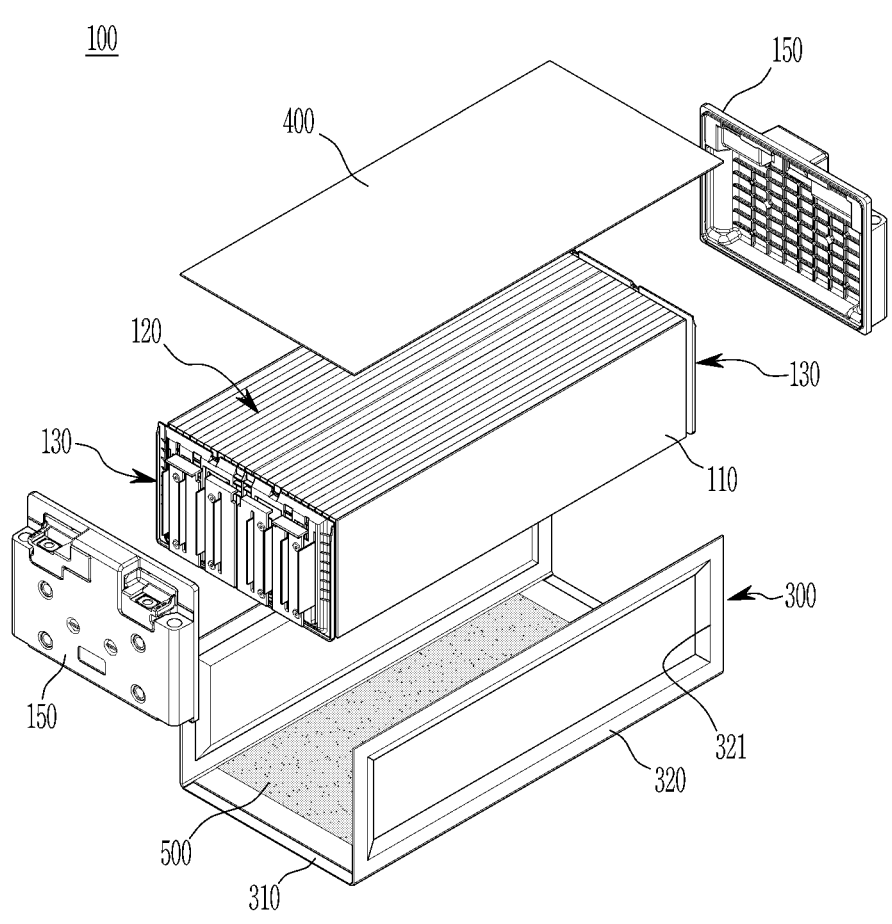

【FIG. 2】
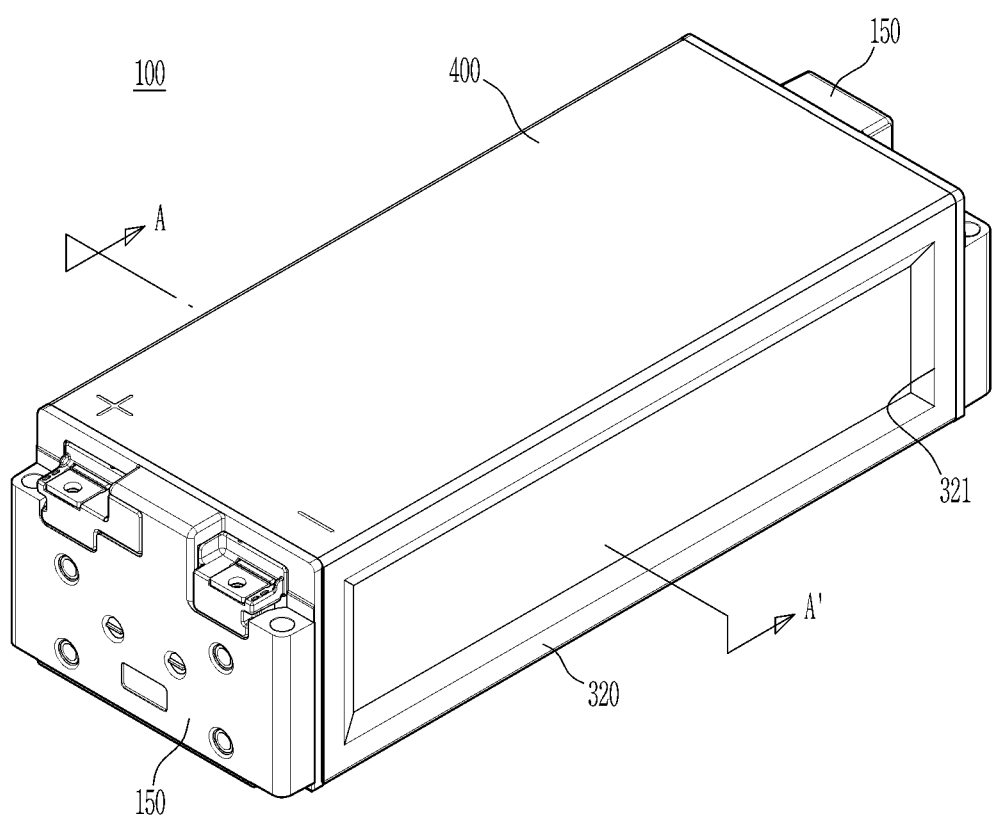

【FIG. 3】
110
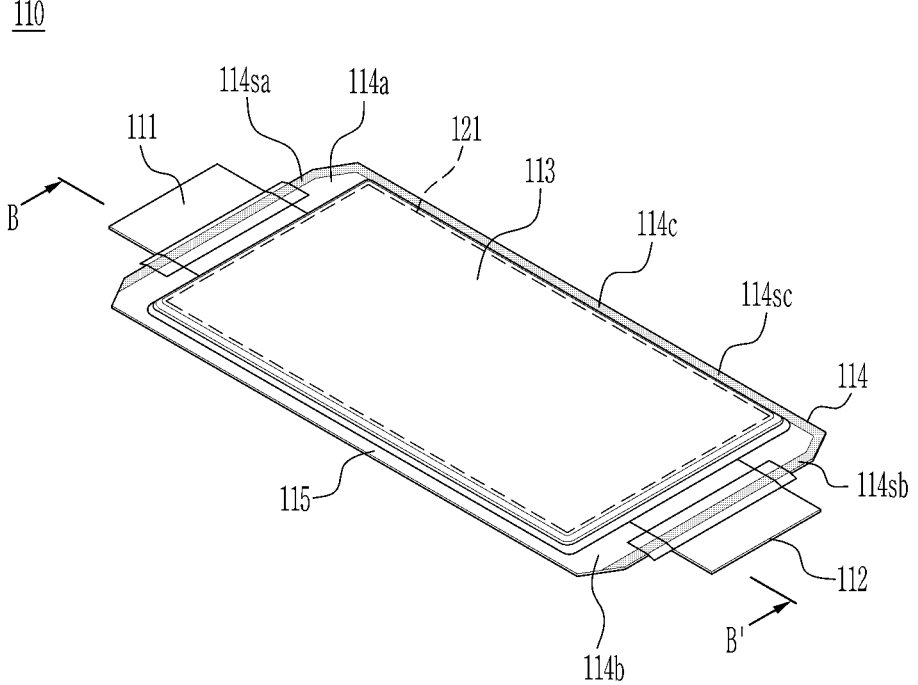
【FIG. 4】
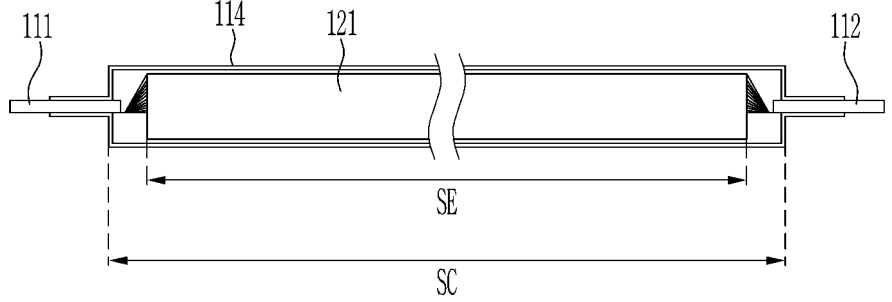

【FIG. 5】
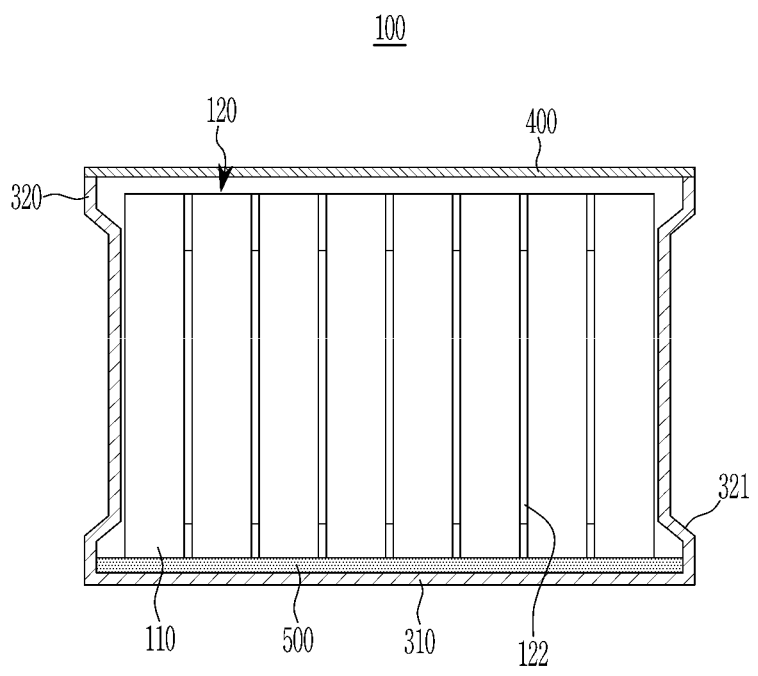
【FIG. 6】
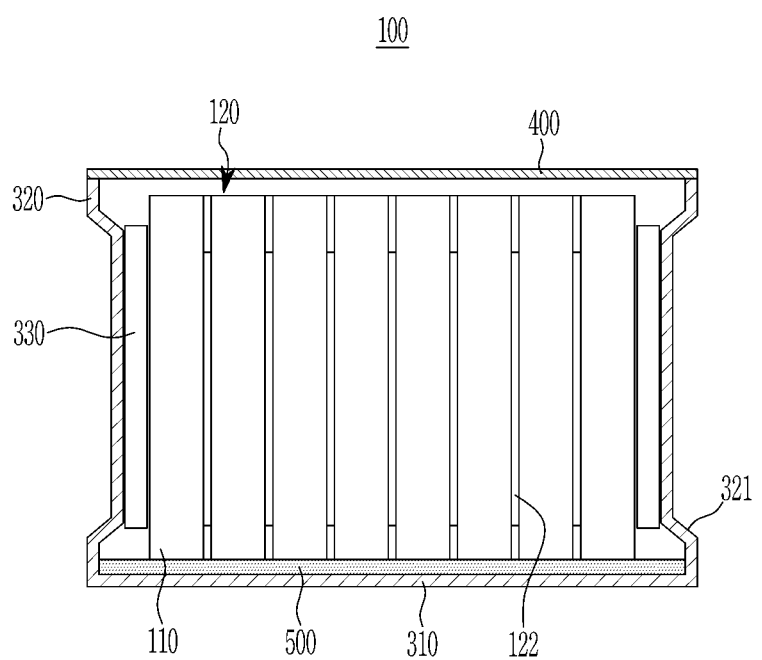

【FIG. 7】
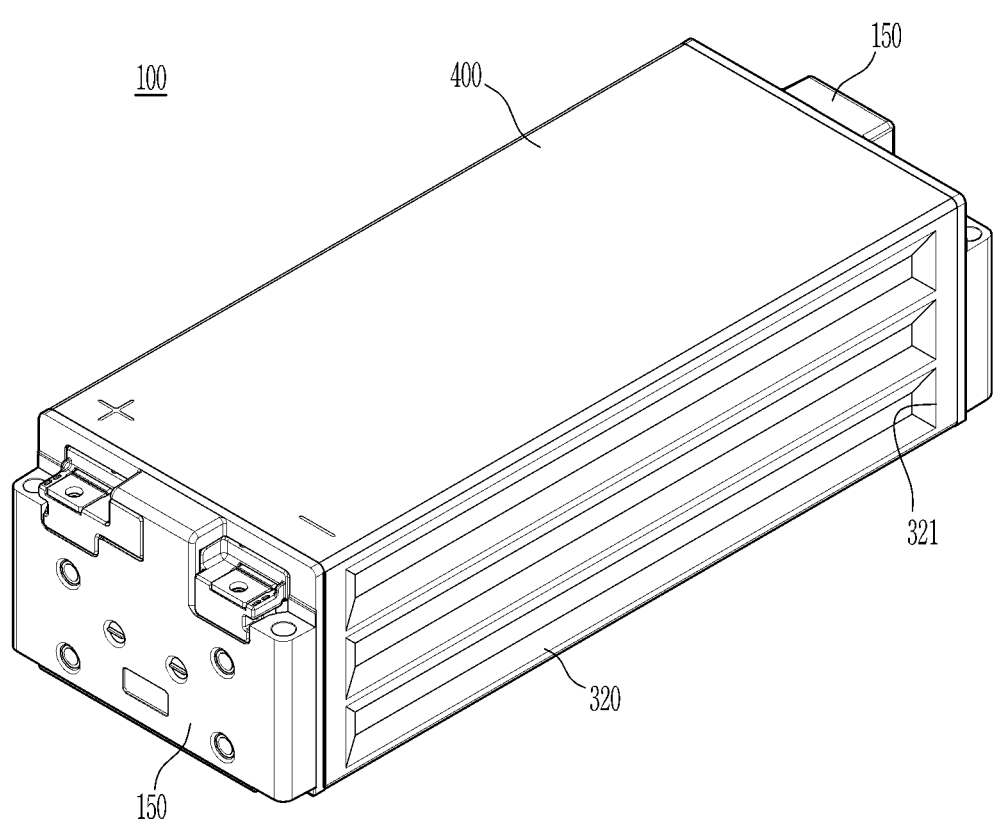

【FIG. 8】
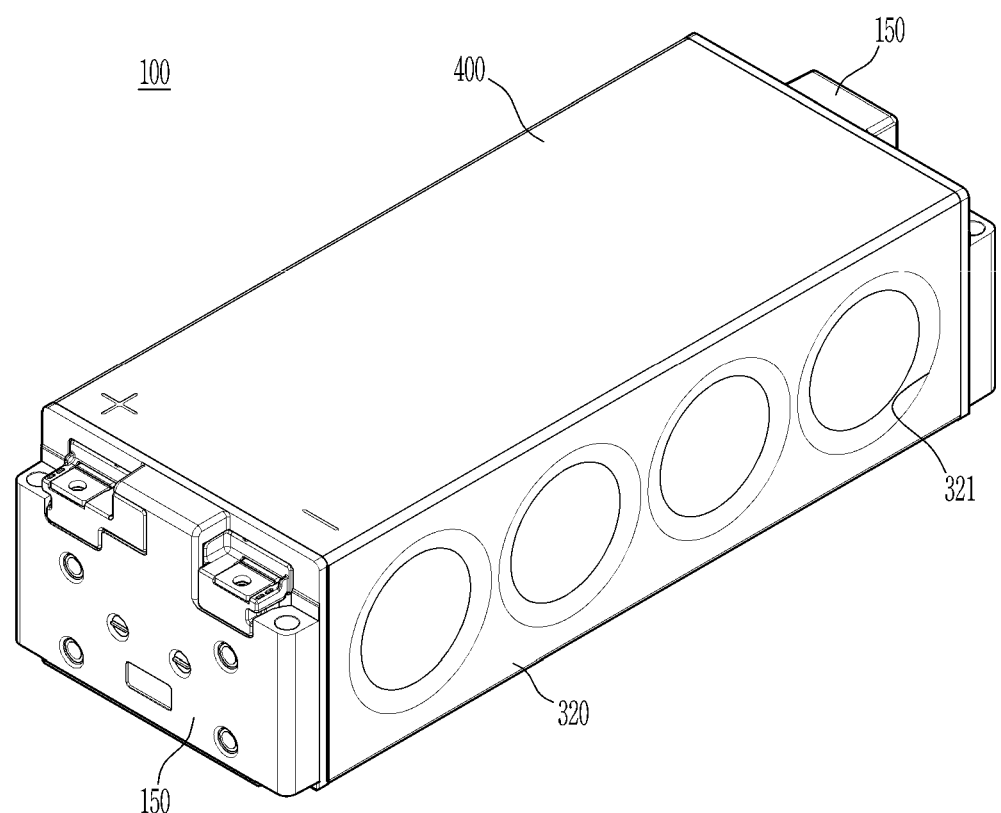

BATTERY MODULE AND BATTERY PACK INCLUDING THE SAME

CROSS-REFERENCE TO RELATED APPLICATIONS

The present application is a national stage entry under 35 U.S.C. § 371 of International Application No. PCT/KR2020/014937, filed on Oct. 29, 2020, published in Korean, which claims priority to Korean Patent Application No. 10-2019-0138938, filed on Nov. 1, 2019, the disclosures of which are incorporated herein by reference in their entireties.

TECHNICAL FIELD

The present invention relates to a battery module and a battery pack including the same, and more specifically, to a battery module capable of fixing an internal configuration of the battery module in a stable and simplified configuration and a battery pack including the same.

BACKGROUND ART

Rechargeable batteries having high application characteristics and electrical characteristics such as high energy density according to their products are widely applied to battery vehicles, hybrid vehicles, and electric power storage devices driven by electric driving sources as well as portable devices. These rechargeable batteries are attracting attention as new energy sources for improving environmental-friendliness and energy efficiency in that they do not generate any by-products of energy use as well as their primary merit, in which they can drastically reduce the use of fossil fuels.

In small mobile devices, one, or two, or three battery cells are used per device, while medium and large devices such as automobiles require high power/large capacity. Therefore, a medium-to-large battery module in which a plurality of battery cells are electrically connected is used.

Since it is preferable for medium and large battery modules to be manufactured with as small a size and weight as possible, a prismatic battery and a pouch-type battery, which may have a high integration degree and have a small weight with respect to capacity, are mainly used as a battery cell of the medium and large battery modules. Meanwhile, in order to protect the cell laminated body from external impact, heat, or vibration, the battery module may include a frame member that receives the battery cell laminated body in an internal space with front and rear openings.

At this time, the side of the battery cell laminated body may include a compression pad that can absorb an increase in volume due to swelling when the swelling occurs due to an increase in the temperature of the battery cell. However, in the case of such a compression pad, the compression pad has a limit in expansion power according to the compression, so there is a problem that there is a limit in assembly tolerance absorption and swelling absorption. In addition, there is a problem that the elasticity decreases over time due to repeated swelling, making it difficult to perform the function of swelling absorption normally. To solve this, if a pad with sufficient elasticity is used, the thickness is excessively increased, and there is a problem that the entire volume of the battery module may be increased.

The above information disclosed in this Background section is only for enhancement of understanding of the background of the invention, and therefore it may contain information that does not form the prior art that is already known in this country to a person of ordinary skill in the art.

DISCLOSURE

Technical Problem

The object to be solved by the present invention is to provide a battery module and a battery pack including the same that may stably perform a function of absorbing swelling while minimizing components inside the battery module.

However, objects to be solved by the embodiments of the present invention are not limited to the above-mentioned problems and can be variously extended within the scope of the technical idea included in the present invention.

Technical Solution Method

A battery module according to an embodiment of the present invention includes: a battery cell laminated body in which a plurality of battery cells each including an electrode assembly are stacked; a U-shaped frame that accommodates the battery cell laminated body and has an opened upper part; and an upper plate covering the battery cell laminated body on the opened U-shaped frame, wherein the U-shaped frame includes a bottom part and two side parts facing each other, the side part includes a depressed part that is depressed inward toward the battery cell laminated body, and the area of the depressed part is equal to or larger than the area of the electrode assembly.

The depressed part may be formed of an elastic member in which an elastic force acts in the stacking direction of a plurality of battery cells.

The elastic member may be formed of a plate-spring.

The depressed part may be in direct contact with the battery cell laminated body.

The battery cell laminated body may further include a double-sided adhesive tape positioned between adjacent battery cells among a plurality of battery cells.

A cushioning pad positioned between the battery cell laminated body and the depressed part may be further included.

A double-sided adhesive tape between the battery cell laminated body and the cushioning pad may be further included.

A thermally conductive resin layer positioned between the battery cell laminated body and the bottom part may be further included, and the thermally conductive resin layer may not overlap the depressed part.

The depressed part may have any one shape selected from quadrangular, circular, and oval.

The depressed part may include a plurality of sub-depressed parts.

The area of the area occupied by the plurality of sub-depressed parts may be equal to or larger than the area of the electrode assembly.

A battery pack according to another embodiment of the present invention may include at least one battery module described above, and a pack case packaging at least one battery module described above.

A device according to another embodiment of the present invention may include at least one battery pack described above.

Advantageous Effects

According to embodiments, by forming the side part of the U-shaped frame with a structure that may fix the battery cell laminated body, it is possible to stably perform the function of the swelling absorption while minimizing parts inside the battery module compared to a conventional art.

DESCRIPTION OF THE DRAWINGS

FIG. 1 is an exploded perspective view showing a battery module according to an embodiment of the present invention.

FIG. 2 is a perspective view showing a state that constituent elements of the battery module of FIG. 1 are coupled.

FIG. 3 is a perspective view showing one battery cell included in the battery cell laminated body of FIG. 2.

FIG. 4 is a view showing a cross-section of the battery cell of FIG. 3 taken along a line B-B'.

FIG. 5 is a view showing a cross-section of the battery module of FIG. 2 taken along a line A-A'.

FIG. 6 is a cross-sectional view of a battery module according to another embodiment of the present invention.

FIG. 7 and FIG. 8 are perspective view of a battery module according to another embodiment of the present invention.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

FIG. 1 is an exploded perspective view showing a battery module according to an embodiment of the present invention, FIG. 2 is a perspective view showing a state that constituent elements of the battery module of FIG. 1 are coupled, FIG. 3 is a perspective view showing one battery cell included in the battery cell laminated body of FIG. 2, FIG. 4 is a view showing a cross-section of the battery cell of FIG. 3 taken along a line B-B', and FIG. 5 is a view showing a cross-section of the battery module of FIG. 2 taken along a line A-A'.

Referring to FIG. 1 and FIG. 2, the battery module 100 according to the present embodiment includes a battery cell laminated body 120 including a plurality of battery cells 110, a U-shaped frame 300 of which an upper part surface, a front surface, and a rear surface are opened, an upper plate 400 covering the upper portion of the battery cell laminated body 120, an end plate 150 positioned on the front and rear surfaces of the battery cell laminated body 120, respectively, and a bus bar frame 130 positioned between the battery cell laminated body 120 and the end plate 150.

When the open sides of the U-shaped frame 300 are called the first side and the second side, respectively, the U-shaped frame 300 is formed of a plate-shaped structure bent to continuously cover both side surfaces facing each other and the lower surface connecting them among the remaining outer surfaces except for the surfaces of the battery cell laminated body 120 corresponding to the first side and the second side. That is, it includes a pair of side parts 320 surrounding both side surfaces and a bottom part 310 surrounding the lower surface of the battery cell laminated body 120 while connecting these side parts. The upper surface corresponding to the bottom part 310 of the U-shaped frame 300 is opened.

In the battery cell laminated body 120, the upper plate 400 has a single plate-shaped structure that covers the remaining upper surfaces except for the front, lower, and rear surfaces covered by the U-shaped frame 300. The U-shaped frame 300 and the upper plate 400 may form a structure surrounding the battery cell laminated body 120 by being joined by welding or the like in a state where the corresponding corner portions are in contact with each other.

The battery cell laminated body 120 includes a plurality of battery cells 110 laminated in one direction, and a plurality of battery cells 110 may be laminated in the Y-axis direction as shown in FIG. 1. The battery cell 110 is preferably a pouch-type battery cell. For example, referring to FIG. 3, the battery cell 110 according to the present embodiment has a structure in which two electrode leads 111 and 112 face each other and are protruded from one end part 114a and another end part 114b of the battery body 113, respectively. The electrode lead included in each battery cell 110 is a positive electrode lead or a negative electrode lead, and the ends of the electrode leads 111 and 112 of each battery cell 110 may be bent in one direction, and are thereby in contact with the ends of electrode leads 111 and 112 of the other battery cells 110 adjacent to each other. The two electrode leads 111 and 112 that are in contact with each other may be fixed to each other through welding or the like, and through this, an electrical connection between the battery cells 110 inside the battery cell laminated body 120 may be made. In addition, the electrode leads arranged at both ends of the battery cell laminated body 120 may be coupled to the bus bar frame 130 to be electrically connected to the bus bar mounted on the bus bar frame 130. The end plates 150 covering the bus bar frame 130 are provided on both opened sides of the U-shaped frame 300, and may be combined with the U-shaped frame 300 and the upper plate 400 by a method such as welding.

The battery cell 110 may be manufactured by adhering both ends 114a and 114b of the case 114 to both side surfaces 114c connecting them with the state that the electrode assembly 121 is accommodated in the battery case 114. In other words, the battery cell 110 according to the present embodiment has a total of three sealing parts 114sa, 114sb, and 114sc, and the sealing parts 114sa, 114sb, and 114sc have a structure that is sealed by a method such as thermal fusion, and the remaining one side may be formed of a connection part 115.

Inside the battery case 114, the electrode assembly 121 and the electrolyte solution may be accommodated. The electrode assembly 114 may be configured of a type that a positive electrode plate and a negative electrode plate are disposed with a separator interposed therebetween. At this time, the electrode assembly 114 may have a structure in which one positive electrode plate and one negative electrode plate are wound with a separator interposed therebetween, or a plurality of positive electrode plates and a plurality of negative electrode plates are stacked with a separator interposed therebetween. These positive and negative electrode plates may be formed as a structure in which an active material slurry is coated to the electrode current collector, respectively, and the slurry may be usually formed by stirring an active material, a conductive material, a binder, and a plasticizer while a solvent is added.

In the electrode assembly 114, an uncoated region to which the slurry is not coated to the electrode plate may be exist, and an electrode tab corresponding to each electrode plate may be formed in this uncoated region. At this time, two electrode leads 111 and 112, respectively, extended from a positive electrode tab and negative electrode tab for electrical connection with an outer terminal or a device, face each other, respectively, and may be protruded from one end part 114a and another end part 114b of the battery body 113, respectively.

The battery case 114 is generally composed of a laminate structure of a resin layer/a metal thin membrane layer/a resin layer. For example, in the case that the battery case surface is formed of an O (oriented)-nylon layer, when laminating the plurality of battery cells to form the battery module, the plurality of battery cells tend to slide easily by an external impact. Therefore, in order to prevent this and maintain the stable laminate structure of the battery cells, an adhesion member such as a viscous adhesive of a double-sided adhesive tape or a chemical adhesive bonded by a chemical reaction upon adhesion may be attached to the surface of the battery case to form the battery cell laminated body 120. For example, as shown in FIG. 5, the laminated structure between the battery cells 110 in the battery cell laminated body 120 may be maintained by interposing the double-sided adhesive tape 122 between the neighboring battery cells 110.

The battery cell laminated body 120 is mounted on the bottom part 310 of the U-shaped frame 300, and a thermally conductive resin layer 500 may be positioned between the battery cell laminated body 120 and the bottom part 310. The thermally conductive resin layer 500 transfers heat generated from the battery cell laminated body 120 to the bottom of the battery module 100 and may serve to fix the battery cell laminated body 120 to the bottom part 310.

A depressed part 321 capable of fixing the battery cell laminated body 120 at the side is formed in the side part 320 of the U-shaped frame 300. The depressed part 321 may be formed of an elastic member capable of applying an elastic force in the lamination direction (the Y-axis direction) of the battery cell 110. For example, it may be formed as a plate-spring as an elastic member.

Accordingly, the depressed part 321 may absorb the swelling (expansion) of the battery cell 110 even if it occurs. Particularly, as shown in FIG. 5, the swelling may be effectively controlled even with a simple structure in direct contact with the battery cell laminated body 120 without additional buffer pads.

At this time, the area of the depressed part 321 may be the same as or larger than the area of the electrode assembly 121 included in the battery cell 110. When the area of the depressed part 321 is formed smaller than the area of the electrode assembly 121, the swelling occurring in the part where the depressed part 321 is not formed cannot be absorbed, and it is also impossible to secure the sufficient fixing force for fixing the cell. As shown in FIG. 4, the area of the electrode assembly 121 may be determined by the length SE of one side of the electrode assembly, etc., and the area of the battery cell 110 may be determined by the length SC of one side of the battery cell, etc. in the battery cell 110, the electrode assembly 121 does not occupy the entire inner space of the battery case 114, and a space for connection with the electrode leads 111 and 112 is further present. For example, the electrode assembly 121 may be about 90% of the area of the battery cell 110. At this time, in order to effectively control the swelling of the battery cell 110, the area of the depressed part 321 needs to be the at least the same as the area of the electrode assembly 121 as described above. When the depressed part 321 supports only the area smaller than the area of the electrode assembly 121, the generated swelling is rather concentrated on the part that is not supported by the depressed part 321, and damage to the battery cell 110 may be further increased.

In addition, when the side of the battery cell laminated body 120 is supported by the depressed part 321, as described above, the bonding force of the double-sided adhesive tape 122 interposed between the battery cells 110 to maintain the laminated structure of the battery cell laminated body 120 may be further improved. That is, it is possible to obtain an effect of pressing from both sides of the battery cell laminated body 120 by the elastic force applied in the stacking direction of the battery cell 110 by the depressed part 321, and the bonding force of the double-sided adhesive tape 122 is increased by this pressure, thereby the laminated structure may be maintained more stably.

As above described, according to the present embodiment, as the elastic force may be applied to the battery cell laminated body 120 by the depressed part 321 formed on the side part 320 of the U-shaped frame 300, it is possible to effectively control the swelling of the battery cell laminated body 120 without a buffer pad, and in particular, by making the area of the depressed part 321 equal to or larger than the area of the electrode assembly 121, the fixing force of the battery cell laminated body 120 may be improved and the swelling may be more effectively suppressed.

FIG. 6 is a cross-sectional view of a battery module according to another embodiment of the present invention.

As shown in FIG. 6, an additional cushioning pad 330 may be further included between the battery cell laminated body 120 and the depressed part 321. Thereby, even if the elastic force by the depressed part 321 decreases with the lapse of time, the restoring force of the cushioning pad 330 may be supplemented, and as the depressed part 321 and the cushioning pad 330 complement each other, compared to a configuration having only a conventional cushioning pad, it is possible to prevent the effect of the swelling control from being deteriorated. In addition, even if the cushioning pad 330 is provided, as the swelling control effect may be basically obtained by the depressed part 321 formed on the side part 320, and even if the thickness of the cushioning pad 330 is not thickened as in the prior art, the swelling may be absorbed while fixing the battery cell laminated body 120 stably.

At this time, the area of the cushioning pad 330 may be the same as or larger than the area of the electrode assembly 121. Accordingly, the swelling absorption by the cushioning pad 330 may also be effectively achieved without damage to the battery cell 110. In addition, an additional double-sided adhesive tape 123 for fixing may be further provided between the cushioning pad 330 and the battery cell laminated body 120. By providing the additional double-sided adhesive tape 123, the position of the cushioning pad 330 may be fixed more stably, and particularly, since the cushioning pad 330 itself is also supported by the depressed part 321, the fixing strength of the additional double-sided adhesive tape 123 positioned between the cushioning pad 330 and the battery cell laminated body 120 may be improved.

FIG. 7 and FIG. 8 are perspective view of a battery module according to another embodiment of the present invention.

As shown in FIG. 7 and FIG. 8, the depressed part 321 may have a quadrangular or circular shape, and although not shown, may have various shapes as needed, such as an oval, a stripe shape formed in a zigzag, a rectangle in a vertical direction, and the like. In addition, it may be formed to have a plurality of sub-depressed parts separated from each other in one depressed part 321. In this case, the smaller the spacing between the sub-depressed parts, the better, and if the area occupied by all of the sub-depressed parts is equal to or larger than the area of the electrode assembly 121, it may be deformed in any way.

On the other hand, one or more battery modules according to an embodiment of the present invention may be packaged in a pack case to form a battery pack.

The battery module described above and the battery pack including it can be applied to various devices. Such a device may be a transportation means such as an electric bicycle, an electric vehicle, a hybrid vehicle, etc., but the present invention is not limited to this, and may be applied to various devices capable of using the battery module and the battery pack including the same, which belongs to the scope of the present invention.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: battery module
110: battery cell laminated body
121: electrode assembly
300: U-shaped frame
320: side part
321: depressed part
400: upper plate

The invention claimed is:

1. A battery module comprising:
a battery cell laminated body in which a plurality of battery cells each including an electrode assembly are stacked;
a U-shaped frame that accommodates the battery cell laminated body therein and has an open upper part, the U-shaped frame including a bottom part and two side parts facing each other; and
an upper plate covering the battery cell laminated body at the open upper part of the U-shaped frame,
wherein one of the side parts includes a depressed part that is a portion of the one of the side parts that extends inward toward the battery cell laminated body relative to a periphery of the one of the side parts, and an area of the depressed part is equal to or larger than an area of the electrode assembly,
wherein the depressed part is formed of an elastic member that is configured to provide an elastic force in the stacking direction of the plurality of battery cells, and
wherein the battery cell laminated body further includes a plurality of double-sided adhesive tapes each positioned between adjacent ones of the plurality of battery cells, respectively.

2. The battery module of claim 1, wherein the elastic member is formed of a plate-spring.

3. The battery module of claim 1, wherein the depressed part is in direct contact with the battery cell laminated body.

4. The battery module of claim 1, further comprising a cushioning pad positioned between the battery cell laminated body and the depressed part.

5. The battery module of claim 4, further comprising a double-sided adhesive tape positioned between the battery cell laminated body and the cushioning pad.

6. The battery module of claim 1, further comprising a thermally conductive resin layer positioned between the battery cell laminated body and the bottom part, and the thermally conductive resin layer does not overlap the depressed part.

7. The battery module of claim 1, wherein the depressed part has a shape selected from: quadrangular, circular, or oval.

8. The battery module of claim 7, wherein the depressed part includes a plurality of sub-depressed parts.

9. The battery module of claim 8, wherein the area together occupied by all of the plurality of sub-depressed parts is equal to or larger than the area of the electrode assembly.

10. A battery pack comprising:
at least one battery module, each battery module as claimed in claim 1; and
a pack case packaging the at least one battery module therein.

11. A device comprising at least one battery pack, each battery pack as claimed in claim 10.

* * * * *